United States Patent [19]

Ibamoto et al.

[11] 4,315,203

[45] Feb. 9, 1982

[54] CONTROL SYSTEM FOR INDUCTION MOTOR-DRIVEN CAR

[75] Inventors: Masahiko Ibamoto; Hiroshi Narita, both of Katsuta; Noboru Oouchi, Hitachi; Shigetoshi Okamatsu, Katsuta, all of Japan

[73] Assignee: Hitachi, Ltd., Tokyo, Japan

[21] Appl. No.: 166,704

[22] Filed: Jul. 3, 1980

[30] Foreign Application Priority Data

Jul. 6, 1979 [JP] Japan .................................. 54-84990

[51] Int. Cl.³ ............................................. H02P 5/40
[52] U.S. Cl. .................................... 318/807; 318/799; 318/801
[58] Field of Search ................ 318/807, 808, 809, 810, 318/811, 801, 802, 803, 799

[56] References Cited

U.S. PATENT DOCUMENTS 3,819,992  6/1974  Opal et al. .......................... 318/808
4,009,427  2/1977  Takahashi ........................... 318/808

Primary Examiner—David Smith, Jr.
Attorney, Agent, or Firm—Craig and Antonelli

[57] ABSTRACT

A control system for an electric car driven by an induction motor which is supplied with electric power of a variable frequency and a variable voltage from an inverter comprises means for detecting the car speed, means for setting a slip frequency of the motor, a frequency command generator, control means for controlling the output frequency of the power converter in accordance with the frequency command and controlling the output voltage of the power converter, a current command generator, and a voltage command generator. The output voltage of the power converter is controlled in accordance with selected one of the current command and the voltage command while being limited by the other command.

11 Claims, 6 Drawing Figures

CONTROL SYSTEM FOR INDUCTION MOTOR-DRIVEN CAR

The present invention relates to an improvement in a control system for an electric car driven by an induction motor.

It has been long considered that the induction motor is suited for driving an electric car in the light of maintenance-free property and a unique speed-torque characteristic of the motor. However, difficulty in controlling a power converter such as inverter, cyclo converter or the like for feeding electric energy to the induction motor has presented an obstacle for the wide use of the induction motor in the field of the electric car industry. Recently, by virtue of progress in semiconductor technology such as thyristor or the like, the electric cars and the engine provided with an induction motor which is supplied with electric energy through an inverter of a pulse width modulation (PWM) type have been increasingly used.

For controlling the induction motor, there are three control quantity, i.e. voltage, current and frequency. When two of these control quantities are controlled, then the other is automatically and definitely determined. For this reason, the control system is classified into a system for monitoring a motor voltage and current, a system for monitoring a motor current and frequency, and a system for monitoring a frequency and voltage.

For instance, the system for monitoring or superrising the voltage and the frequency is disclosed in a literature titled "Railways," August 1979, p. 33, FIG. 7. According to this prior art system, the output frequency $f_1$ of an inverter is so controlled that a current command $w_i$ coincides with an actual motor current $x_i$ in dependence on a sum or a difference between a rotation frequency $f_n$ and a slip frequency of the induction motor.

The three control systems described above have however respective disadvantages. More specifically, in the case of the control system based on the monitoring of the motor voltage and current, there are provided a voltage control loop arranged to perform the control such that a voltage command for making a ratio between the voltage and the frequency (v/f) constant coincides with the output voltage of the inverter, and a current control loop for controlling the frequency of the inverter so that the current flowing through the induction motor may coincide with a desired current command. In this control system, once idling of tractive wheels occurs, the motor current is decreased, while the inverter frequency is increased in an effort to restore the motor current. Consequently, torque produced by the induction motor will be increased more and more, involving a grave idling.

In the case of the control system disclosed in the literature cited above, when the motor current is decreased due to the idling, the inverter output voltage is increased for increasing the motor current. Accordingly, the torque generated by the induction motor can not be reduced instantly. Only when the inverter voltage has been increased to a maximum value, the torque is then allowed to be reduced in accordance with the inherent torque characteristic. In this manner, re-adhesion can take place with a considerable time delay, to a great disadvantage.

In the third control system for monitoring the frequency and voltage, there are provided a voltage control loop adapted to perform control such that a voltage command for making a ratio between the voltage and the frequency (v/f) constant coincides with the output voltage of the inverter and a frequency control loop for controlling the frequency of the inverter by adding together or subtracting each other the slip frequency and another frequency which corresponds to the speed of the electric car. In the case of this control system, an improved idling suppression can be attained when the frequency corresponding to the actual running speed of the electric car can be detected in place of the rotation number of the tractive wheel. Reference is to be made to U.S. patent application Ser. No. 125,755, (Corresponding to West German patent application No. P-3008279.2 and French patent application No. 8004850), if necessary. However, since no control is made to the motor current and hence the output current from the inverter, considerations have to be paid to deal with the increasing in the motor current in designing the inverter. For example, it is required to impart a commutation capability to the inverter with a relatively large tolerance so as to be compatible with an expected increasing in the motor current, to a disadvantage.

A primary object of the invention is to provide an improved control system for an electric car driven by an induction motor which includes a power converter producing an AC power of a variable voltage and a variable frequency and which is capable of exhibiting an excellent adhesion establishing performance while suppressing increase in the motor current.

In view of the above object, there is provided according to an aspect of the invention, a control system for an electric car of an induction motor drive type, which comprises a power converter for producing an AC power of a variable frequency and a variable voltage, an induction motor adapted to be fed from the power converter and drive the electric car, means for detecting speed of the electric car, means for setting a slip frequency of the induction motor, means for preparing a frequency command by adding together or subtracting each other the slip frequency and the car speed, means for controlling the output frequency of the power converter in accordance with the frequency command, means for controlling the output voltage of the power inverter, means for producing a current command for the induction motor, and means for producing a voltage command in dependence on the speed of the induction motor, wherein the output voltage control means is so arranged as to control the output voltage of the power converter in accordance with one of the current command and the voltage command under limitation by the other.

According to a preferred embodiment of the invention, the output voltage of the power converter is controlled by a current feed so that difference or deviation between the current command and the actual motor current is reduced to zero. When the output voltage of the power converter tends to dissatisfy the requirement of constancy of the ratio between the voltage and the frequency (v/f=constant) to an appreciable degree as the result of the control performed by the current feedback loop, then a voltage control loop becomes operative to suppress such digression of the inverter output voltage. As the consequence, the current is controlled to the desired value, while the voltage-vis-à-vis-ratio (v/f ratio) is maintained with a desired range. Thus, there can be accomplished a control system which exhibits an excellent adhesion establishing performance and can suppress increase in the motor current.

Another object of the invention is to provide a control system for an electric car of an induction motor drive type which is less susceptible to generation of variation in the motor torque.

According to another aspect of the invention, it is proposed to hold the slip frequency command at a predetermined value when the motor current is not higher than a predetermined level, while the slip frequency command is decreased when the motor currents exceeds the predetermined level.

The above and other objects, features and advantages of the invention will become more apparent from the following description taken in conjunction with the accompanying drawings, in which.

In the following, preferred embodiments of the present invention will be described in detail by referring to the accompanying drawings.

Figure 1:
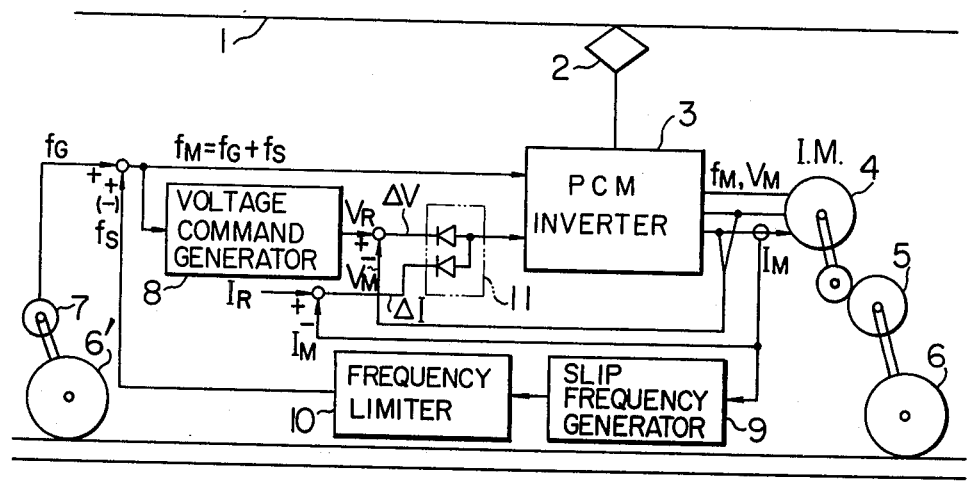
FIG. 1 shows schematically a general arrangement of a control system for an induction motor drive type electric car according to an embodiment of the invention.

Referring to FIG. 1 which illustrates schematically a general arrangement of an induction motor drive system for an electric car, a DC voltage fed from a DC power supply source 1 such as overhead conductors through a pantograph 2 is supplied to a power converter 3 such as a pulse width modulation (PWM) type inverter, for example, to be converted into a three-phase power having a frequency $f_M$ and a voltage $V_M$ and utilized for rotating an induction motor 4. A rotary torque produced from the induction motor 4 is transmitted to a tractive wheel 6 of the electric car through a reduction gear train 5 thereby to drive the electric car. In the case where an AC overhead line is used as the power supply source 1, the power converter may be constituted by a combination of a rectifier and an inverter or alternatively by a frequency converter. Of course, the overhead line power source may be replaced by a battery or a combination of a Diesel engine and a generator.

The speed of the electric car is detected as a frequency signal $f_G$ by a pulse generator 7 disposed in association with a trailing wheel 6'. This frequency $f_G$ is so selected as to be equal to the output frequency from the inverter 3 on the assumption that the induction motor 4 is rotated at a synchronous speed. Accordingly, when the inverter 3 is operated at the frequency $f_M$ which is equal to a sum of the frequency $f_G$ and a slip frequency $f_s$ (in a power running operation) or a difference between the frequencies $f_G$ and $f_s$ (in a regenerative braking operation), then the slip frequency $f_s$ is constantly maintained in the operation of the induction motor 4.

There is provided a command voltage generator unit 8 which is supplied at the input thereof with the frequency command $f_M$ to the inverter 3 and produces a command voltage $V_R$ of a magnitude substantially proportional to the frequency $f_M$. The output command voltage $V_R$ is compared with the output voltage $V_M$ from the inverter 3, whereby a resultant deviation or difference voltage $\Delta V$ is applied to one input of a lower order priority circuit 11.

On the other hand, a current command $I_R$ issued from a command current generator (not shown) is compared with a motor current $I_M$, as the result of which a current difference signal $\Delta I$ is supplied to the other input of the lower order priority circuit 11.

One of the inputs to the lower order priority circuit 11 which is less than the other is effective to control the output voltage of the inverter 3.

There is further provided a slip frequency setting device which is constituted by a slip frequency control circuit 9 adapted to be supplied with the motor current $I_M$ and produce the slip frequency signal in inverse proportion to the motor current $I_M$ and a slip frequency limiter 10.

The frequency control is effected in the following manner. The frequency $f_G$ corresponding to the car speed as detected by the pulse generator 7 is added with the slip frequency $f_s$. The slip frequency control circuit is operative so that the slip frequency $f_s$ varies in inverse proportion to the motor current $I_M$. In other words, the slip frequency $f_s$ is decreased as the motor current $I_M$ is increased (refer to FIG. 3, a linear curve A) thereby to maintain the motor current to be constant. The limiter 10 serves to prevent the slip frequency $f_s'$ from being increased beyond a predetermined frequency value $f_s'$ in spite of decreasing in the motor current (refer to FIG. 3, a linear curve B).

A constant current control is effected for the motor current $I_M$ through a negative feedback loop which functions to compare the detected motor current $I_M$ with the reference current $I_R$. A motor voltage control is also performed through comparison of the detected motor voltage $V_M$ with a reference voltage $V_R$ which is produced from the reference or command voltage generator 8 in proportion to the frequency $f_M$ through a negative feedback loop, so that the ratio of $V_M/f_M$ to constant. In this conjunction, it should be recalled that when two of the three control quantities described hereinbefore are determined in the steady state, the other quantity is thereby definitely determined without leaving any room for control. For this reason, there arises a necessity to prevent the three control loops described above from being interfered with one another. To this end, the lower order priority circuit 11 is provided for coupling the motor voltage control loop and the motor current control loop in the case of the illustrated embodiment.

Figure 2:
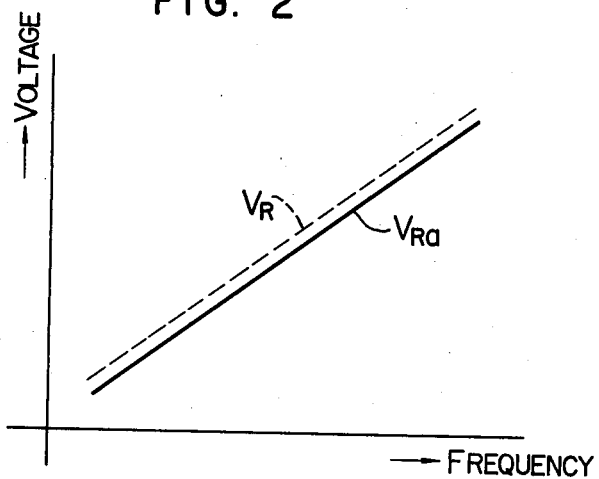
FIG. 2 illustrates graphically a frequency-voltage characteristic of a voltage command generating circuit.
Figure 3:
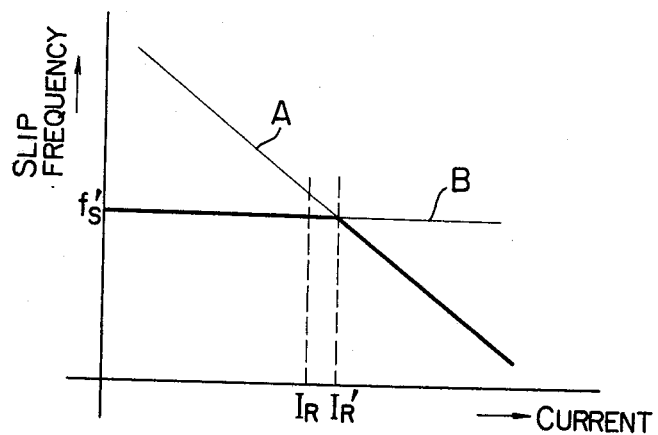
FIG. 3 illustrates graphically a motor current-slip frequency characteristic of a slip frequency setting circuit.

With the circuit arrangement described above, the reference or command current $I_R$ is so set that the motor current $I_M$ is at a predetermined level, while the slip frequency $f_s$ is so adjusted by the frequency limiter 10 that the slip frequency attains a predetermined limit value $f_s'$ at a motor current $I_R'$ which is slightly greater than the motor current $I_M$ of the predetermined value (refer to FIG. 3). Further, the motor voltage $V_M$ is measured as a function of various frequency in the state where the motor current $I_M$ is at the preset value, thereby to determine the motor voltage-frequency characteristics. Subsequently, the voltage-frequency characteristic for the output of the inventer is measured under no-load condition after the motor has been disconnected. On the basis of the results of the measurement, the reference or command voltage generator circuit 8 is so adjusted that a characteristic curve slightly higher than the measured curve can be obtained under the load condition. For example, assuming that the characteristic under no-load condition is represented by a broken line curve $V_R$ shown in FIG. 2, the characteristic under load condition may be so adjusted, as to be represented by a solid line curve $V_{Ra}$.

Next, operation of the inverter control system which has been adjusted in this manner will be described.

In a steady state in which the motor current $I_M$ is at the preset value, the motor current remains smaller than the level set by the limiter 10, as the result of which the slip frequency $f_s$ is limited to the predetermined value $f_s'$ by the limiter 10. At that time, the motor voltage $V_M$ is slightly lower than the value set by the motor voltage control loop, this control loop tries to increase the motor voltage. However, because of the fact that the motor voltage demanded by the motor current control loop is lower, the constant current control for the motor current is selected by the lower order priority circuit 11.

Consideration will be made to the case where the tractive wheel 6 is idling. Then, the revolusion number of the induction motor is rapidly increased to approach to the synchronous speed, while the motor current is simultaneously decreased. Since the motor current is caused to decrease further in the slip frequency control loop, the limiting function of the limiter 10 will be sustained continuously, whereby the slip frequency $f_s$ is maintained at the predetermined value. Consequently, the inverter frequency $f_M$ will undergo no variation. On the other hand, in the motor current control loop, the motor voltage tends to be increased in an effort to maintain the constant current. However, since the motor voltage will soon attain the value preset by the motor voltage control loop, the voltage control loop is made effective through the function of the lower order priority circuit 11, whereby the increasing in the motor voltage $V_M$ is suppressed. As the consequence, the torque is rapidly reduced to allow the re-adhesion to take place.

Figure 4:
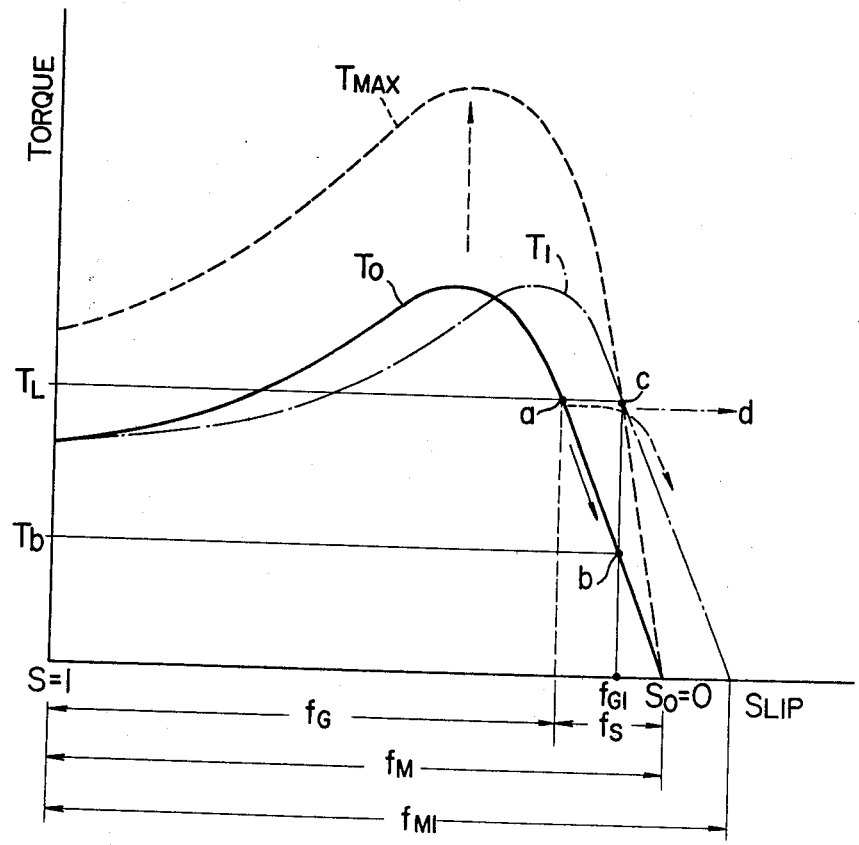
FIG. 4 shows graphically a slip-torque characteristic of an induction motor to illustrate operation of the control system according to the invention.

The operation outlined above will be described further by referring to FIG. 4. It is assumed now that the electric car is in a power running mode in the balanced state at a point a on a motor torque curve $T_O$ under a load torque $T_L$ at a speed $f_G$ with the slip frequency being set at the value $f_s$. Further, assuming that the tractive wheel 6 becomes idling for some reasons, the motor speed will then be increased involving transition to a point b at a speed $f_{G1}$, whereby the motor torque is reduced to a level $T_b$ to bring about re-adhesion according to the inherent characteristic of the induction motor drive system.

However, provision of the constant current control loop provides an obstacle in making use of the inherent characteristic of the induction motor described above. More specifically, when the constant current control is established by adjusting the output voltage from the inverter, the idling causes the motor speed to be increased, while the motor current $I_M$ tends to be decreased. The output voltage from the inverter will then be increased to a maximum value thereof in order to prevent the motor current $I_M$ from being decreased. As the consequence, the motor torque varies in a manner illustrated by a broken line curve $T_{max}$ in FIG. 4 and is stabilized only at a point c. Subsequently, the motor torque is reduced along the maximum torque curve $T_{max}$ as indicated by a broken line arrow until the re-adhesion has taken place. However, once the idling is promoted, the re-adhesion can occur only with a considerable time delay.

Further, the constant current control system based on the frequency adjustment will involve the most undesirable behavior. More specifically, since the motor current $I_M$ which tends to be decreased due to the idling of the tractive wheel 6 is maintained at a constant value, the frequency $f_M$ is increased to a value $f_{M1}$, while the torque varies in a manner represented by a dotted-line curve $T_1$. In other words, the motor torque is not reduced, whereby the idling is promoted. Consequently, the frequency is increased more and more, giving rise to the occurrence of a grave or serious idling as indicated by a dotted-broken line arrow d.

In contrast, according to the embodiment of the invention shown in FIG. 1, although the decreasing in the motor current $I_M$ due to the idling will also bring about the current deviation $\Delta I$, the inverter output voltage will be limited by the voltage deviation $\Delta V$ under the action of the lower order priority circuit 11 when the current deviation $\Delta I$ exceeds the voltage deviation $\Delta V$. By virtue of the fact that the reference or command voltage $V_R$ is set at a level slightly higher than the normal characteristic $V_{Ra}$ of the induction motor, as described hereinbefore in conjunction with FIG. 2, the motor torque curve will scarcely undergo deviation from the curve $T_O$ shown in FIG. 4. In other words, the inherent torque characteristic $T_O$ proper to the induction motor can be fully made use of in establishing rapidly the re-adhesion. Additionally, because the constant current control loop for monitoring the motor current is maintained alive, there is no danger of the motor current being increased.

Next, elucidation will be made of the pulsation (pulsating variation) of the torque.

Figure 5:
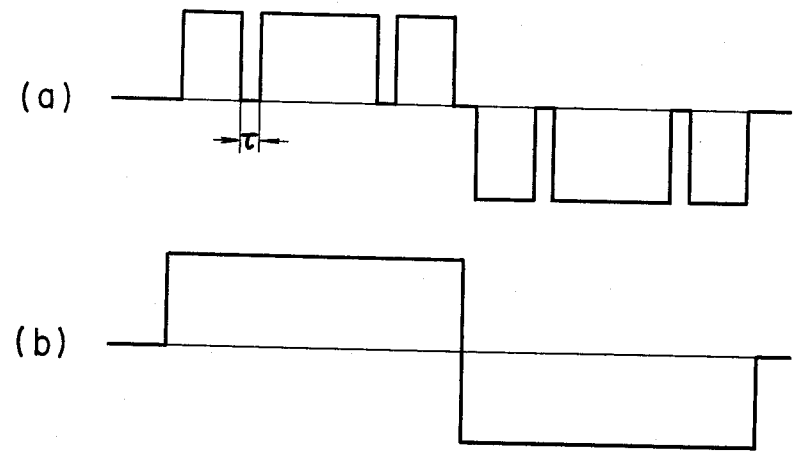
FIG. 5 is a waveform diagram to illustrate waveforms of output voltage of a pulse width modulation type inverter.

The pulse width modulation type inverter for an electric car is usually constituted by thyristors in consideration of the magnitude of voltage and current to be processed. In this connection, it will be noted that the output voltage of the inverter cannot be controlled continuously to a maximum value, because the thyristors require a predetermined time for commutation. More specifically, the output voltage of the inverter (motor voltage $V_M$) will take a waveform such as shown in FIG. 5 at (a) in the vicinity of the maximum value. Referring to this waveform diagram, the width of a slit appearing in the waveform cannot be made shorter than the time duration $\tau$ required for the commutation. Accordingly, the output voltage of the inverter or the motor voltage $V_M$ cannot be increased higher than about 95% of the maximum value. In order to allow the output voltage of the inverter to attain fully the maximum voltage (i.e. 100% of the maximum voltage), the output voltage of the inverter must have a waveform shown in FIG. 5 at (b). However, abrupt transition from the waveform (a) to the one (b) will mean discontinuous change in the output voltage of the inverter. Then, the ratio of $V_M/f_M$ will be changed temporarily, because the inverter frequency $f_M$ is constant, resulting in a great current flow through the motor which in turn gives rise to abrupt change in the motor torque. In this case, the constant current control loop becomes effective to return the output voltage immediately to the original value (e.g. 95% of the maximum value), and control is effected alternately between the modes represented by the waveforms (a) and (b) shown in FIG. 5 so that an average motor current is constant. However, it should be mentioned that such alternate or switching control is likely to produce a frequency component corresponding to the switching or repetition frequency, which frequency component having distinctly a lower frequency than that of the inverter's operation frequency will then be introduced into a feeder line and may possibly provide a cause for failure in a track circuit or the like car signal circuit to a disadvantage for application to the electric car.

Now, consideration will be given to the operation of the embodiment of the invention shown in FIG. 1 under similar condition, i.e. on the assumption that the motor voltage $V_M$ is stepped up from 95% to 100% of the maximum level. In this case, the output voltage $V_M$ of the inverter is changed from the waveform (a) to the one (b) shown in FIG. 5. In this connection, it should be noted that the invention makes it possible to lock the motor voltage $V_M$ of the waveform (b) once attained to thereby prevent the voltage $V_M$ from returning to the waveform (a), if desired. On the other hand, if the waveform of the motor voltage $V_M$ is forcively locked in the hitherto known control system, the output voltage of the inverter (i.e. the motor voltage $V_M$) can no more adjusted, whereby the constant current control function will be lost, to give rise to a large motor current. However, in the case of the illustrated system according to the invention, the enforcive locking of the motor voltage $M_V$ to the waveform (b) shown in FIG. 5 is made possible for the reason described below.

When the motor voltage $V_M$ is shifted stepwise from 95% to 100% of the maximum value thereof, the motor voltage control loop will function to pull down the motor voltage. However, because the waveform (b) is forcibely locked, no voltage control function can not be exhibited. The same applies to the motor current control loop. Under the circumstances, the motor current tends to be increased. Since the preset value of the slip frequency control circuit 9 is however soon attained, the slip frequency control circuit 9 pulls down the slip frequency. In this manner, the slip frequency $f_s$ is automatically regulated so that the motor current $I_M$ is at the value set by the slip frequency control loop, whereby the constant current control is effected for the motor current. The control described just above may as well be referred to as the constant power control in the light of the fact that the motor voltage $V_M$ is constant (at the maximum value) with the motor current $I_M$ being constant (at the value set by the slip frequency control loop).

Next, examination will be made on the torque produced before and after the motor voltage $V_M$ is shifted stepwise from 95% (waveform a in FIG. 5) to 100% (waveform b in FIG. 5) of the maximum value. Although the motor current $I_M$ remains substantially constant (slightly increases) upon shifting to 100% of the maximum value, the induction field flux will be increased by 5%, involving an increase in torque by ca. 5%. However, since the motor current $I_M$ scarcely undergo variation, the abrupt change in the torque on the order of 5% will not produce any appreciable shock. In reality, no appreciable shock was produced in a trial car operation carried out by the inventors of the present application.

The control system according to the present invention described above can always assure a stabilized control even in the transient operating conditions such as the idling of the tractive wheel, stepwise variation in the motor voltage or the like.

Figure 6:
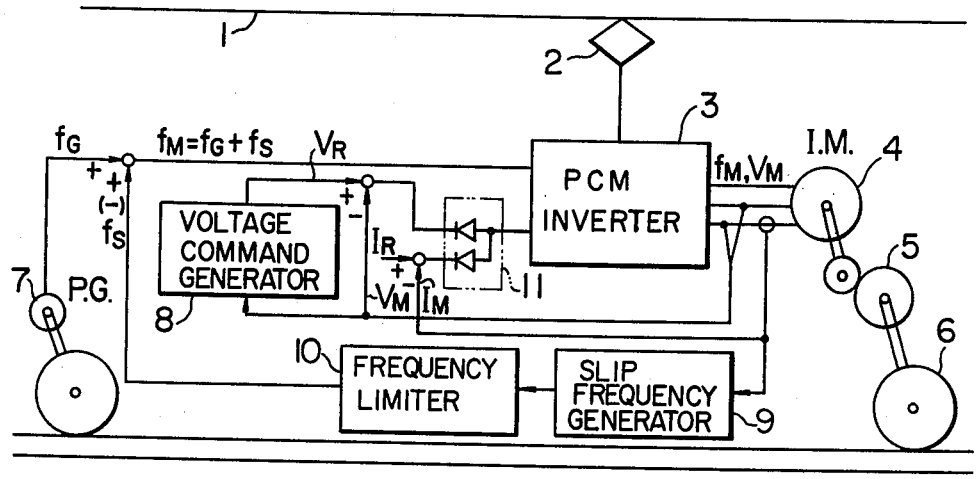
FIG. 6 is a view similar to FIG. 1 and shows another embodiment of the invention.

FIG. 6 shows another embodiment of the present invention which differ from the one shown in FIG. 1 in that the reference or command voltage generator circuit 8 has the actual motor voltage $V_M$ as the input thereto in place of the frequency input signal. As will be appreciated from the foregoing description, the voltage control loop should be set at a voltage value slightly higher than the motor voltage prevailing at the time when the constant current control is made to a predetermined limit value through the current control loop. However, the frequency characteristic of the motor voltage is inherently non-linear under the influences of excitation current of the motor, resistance of the primary winding and the like factor. Consequently, in the case of the control system illustrated in FIG. 1, it will be necessary to incorporate a non-linear correcting function element in the reference voltage generator circuit 8, to thereby correct the frequency characteristic of the $V_M/f_M$ constancy control effected by the voltage control loop so that it may take a value slightly higher than the actual frequency characteristic.

On the other hand, in the case of the control system shown in FIG. 6, the actual motor voltage $V_M$ is detected and the reference voltage of a magnitude slightly higher than the detected motor voltage is produced, whereby the necessity for providing the non-linear correcting function element is eliminated. Accordingly, the reference voltage generating circuit 8 can be implemented inexpensively in a simplified manner, while the reference voltage can be set at the most appropriate value without requiring troublesome adjustment or regulation.

It should however be mentioned that means should be provided for maintaining the reference voltage $V_R$ invariable in spite of abrupt change in the motor voltage, since the voltage control loop of the system shown in FIG. 6 is intended to suppress any abrupt increase in the motor voltage, e.g. to present the motor voltage from being increased upon the idling of the tractive wheel 6. In other words, the reference voltage generating circuit 8 should be imparted with a large time constant so that the output signal from the circuit 8 changes only slowly in response to variation in the input signal thereto.

What is claimed is:

1. A control system for an electric car of an induction motor drive type, comprising a power converter for producing an AC power of a variable frequency and a variable voltage; an induction motor adapted to be fed from said power converter and drive said electric car; means for detecting speed of said electric car; means for setting a slip frequency of said induction motor; means for preparing a frequency command by adding together or subtracting each other said slip frequency and the speed of said electric car; means for controlling the output frequency of said power converter in accordance with said frequency command, means for controlling the output voltage from said power converter; means for producing a current command for said induction motor, and means for producing a voltage command in dependence on the speed of said induction motor, wherein said output voltage control means is so arranged as to control the output voltage of said power converter in accordance with one of said current command and said voltage command under limitation by the other of said current command and said voltage command.

2. A control system according to claim 1, wherein said one command is constituted by said voltage command, while the other command is constituted by said current command.

3. A control system according to claim 1, wherein said one command is constituted by said current command, while the other is constituted by said voltage command.

4. A control system according to claim 1, wherein said voltage command preparing means is adapted to produce the voltage command which is substantially proportional to said frequency command.

5. A control system according to claim 1, wherein said voltage command preparing means includes means for detecting output voltage of said power converter, and means for delaying the output of said voltage command preparing means.

6. A control system according to claim 1, wherein said slip frequency setting means is adapted to produce the slip frequency having a constant frequency when the motor current is smaller than a predetermined value, and when said motor current exceeds said predetermined value, said slip frequency setting means produces the slip frequency having a frequency decreased in accordance with the quantity by which said motor current exceeds said predetermined value.

7. A control system for an electric car of an induction motor drive type; comprising a power converter for producing an AC power of a variable frequency and a variable voltage; an induction motor adapted to be fed from said power converter and drive said electric car; means for detecting speed of said electric car; means for setting a slip frequency of said induction motor; means for preparing a frequency command by adding together or subtracting each other said slip frequency and the speed of said electric car; means for controlling the output frequency of said power converter in accordance with said frequency command; means for controlling the output voltage from said power controller; means for setting a current command to said induction motor; means for detecting a motor current of said induction motor; means for determining a current deviation of said motor current from said current command; means for preparing a voltage command which is substantially proportional to said frequency command; means for detecting the output voltage of said power converter; means for determining a voltage deviation of said output voltage from said voltage command; and lower order priority means for extracting either said current deviation or said voltage deviation with priority given to the deviation of a lower value, wherein the means for controlling the output voltage of said power converter is adapted to respond to the output from said lower order priority means.

8. A control system according to claim 7, wherein said voltage command preparing means is adapted to prepare the voltage command which is higher than a frequency-vis-à-vis-voltage characteristic of said induction motor operating in the state corresponding to said current command, whereby said output voltage control means is adapted to function as a current feedback loop in a range of the output voltage limited in accordance with said voltage command.

9. A control system according to claim 7, wherein said voltage command preparing means being adapted to prepare a voltage command which is lower than the frequency-vis-à-vis-voltage characteristic of said induction motor operating in a state corresponding to said current command, whereby said output voltage control means is adapted to function as a voltage feedback loop in a range of output voltage limited in accordance with said current command.

10. A control system according to claim 7, wherein said slip frequency setting means is adapted to produce the slip frequency having a constant frequency when the output from said current detecting means is lower than a predetermined value, and when said output of said current detecting means exceeds said predetermined value, said slip frequency setting means produces the slip frequency having a frequency decreased in accordance with a quantity by which said output of said current detecting means exceeds said predetermined value.

11. A control system for an induction motor drive type electric car, comprising a power converter for producing an AC power of a variable frequency and a variable voltage; an induction motor adapted to be fed from said power converter and drive said electric car; means for detecting speed of said electric car; means for setting a slip frequency of said induction motor; means for preparing a frequency command by adding together or subtracting each other said slip frequency and the speed of said electric car; means for controlling the output frequency of said power converter in accordance with said frequency command; means for controlling the output voltage of said power converter in dependence on a voltage command and/or a current command, wherein said slip frequency setting means is adapted to produce a slip frequency command having a constant value when the motor current is lower than a predetermined value, and when said motor current exceeds said predetermined value, said slip frequency command setting means produces the slip frequency command of a correspondingly reduced value.

* * * * *